2,858,234
METHOD OF COATING LAMPS

William E. Ishler, Cleveland Heights, and George W. Cressman, Chagrin Falls, Ohio, assignors to General Electric Company, a corporation of New York No Drawing. Application October 24, 1955
Serial No. 542,473

5 Claims. (Cl. 117—33.5)

This invention relates to the coating of vitreous articles with materials useful in the production or control of light. The invention is more particularly concerned with coating the internal walls of elongated fluorescent lamps with pigments which, in conjunction with the phosphor, control the color rendition of the lamp.

In several colored fluorescent lamps, it is not possible to rely exclusively on selection of the phosphor to achieve the desired color rendition. It is then necessary to use pigments coated on the envelope wall which operate by subtraction or absorption of undesired colors to increase the proportion of the desired color in the spectral output whereby to achieve greater intensity or saturation in the desired color. For instance, a red fluorescent lamp presently commercially available utilizes a cadmium borate manganese activated phosphor which peaks at approximately 6200 A. A fluorescent lamp having this phosphor and nothing more has considerable radiation outside the red, particularly in the yellow and in the visible blue mercury lines. As a result, the lamp has an orange cast, particularly when the eye has the opportunity to compare it with a blue lamp. In order to deepen the red color, that is to provide a more saturated red, the lamp is provided with a pigment which acts as a filter and narrows the visable band to about 1200 A., for instance from 6000 to 7200 A.

When using a pigment for color control by subtraction, that is by absorption of undesired colors in transmission, uniformity of thickness of coating becomes very critical. Variations in thickness of coating which would be hardly noticeable and which could be completely disregarded occurring in the phosphor which actually generates the light become very noticeable when they occur in the pigment. This may be fairly readily explained by the fact that the absorption of light in such a pigment coating is exponentially proportional to the thickness of the coating. In the case of a phosphor there is a tendency to compensation inasmuch as a thicker coating of phosphor will effect a more complete conversion of ultraviolet radiation into light, coupled with a greater self-absorption of the light, whereas a thinner coating will effect a less complete conversion of ultraviolet radiation into light, coupled with less internal absorption of the light, the net result being less variation of light output with thickness of coating. When the pigment coating is not of even thickness and is otherwise lacking in uniformity, the lamp when lit is streaked and has a poor appearance.

For greater marketability from the point of view of good appearance and resistance to marring and to weathering, it is desirable to place the pigment coating on the inside of the colored fluorescent lamp. The pigment coating is placed next to the inside glass wall of the envelope and the phosphor coating is placed internally thereover. The phosphor thus absorbs the 2537 A. radiation produced by the electric discharge through the low pressure mercury vapor of the lamp, and the visible radiation produced by the phosphor is in turn filtered by the pigment coating whereby to achieve the desired color rendition. This arrangement, of course, requires that the binder which is used for the pigment coating remain substantially unaffected by the binder or vehicle which is subsequently used in applying the phosphor coating.

The general object of the invention is to provide a new and improved method for coating a vitreous surface with a material useful in the production or control of radiation.

A more specific object of the invention is to provide a new and improved method for coating the inside wall of a fluorescent lamp envelope with a color-subtractive pigment, such method producing a coating of uniform thickness substantially free of streaking and capable of accepting a subsequent coating of phosphor.

A feature of the coating method of the invention is its capacity to produce uniform coatings substantially free of streaking with run of the mill glass showing surface defects and variations in surface condition, thereby avoiding the need for special selection of the lamp envelopes.

In accordance with the invention, we have found that with a pigment vehicle consisting of an alkyl acetate with a small percentage of nitrocellulose serving as binder, a substantial improvement in coating characteristics from the point of view of reduction or substantial elimination of streaking may be effected by the addition of a small proportion of a lactic acid ester, and more particularly an alkyl lactate, such as methyl, ethyl, propyl or butyl lactate. The quantity of the lactic acid ester required to produce a given degree of uniformity in the coating will vary with the choice of lactic ester and with the nature of the pigment, primarily its physical characteristics and particularly its particle size, the proportion of lactic ester required increasing with the particle fineness. We have obtained the best results with butyl lactate in proportions by weight in a coating suspension consisting of a suspension of pigment within a butyl acetate vehicle with dissolved nitrocellulose, not exceeding 20 percent. For practical benefits, the proportion of butyl lactate is preferably above 3 percent, but there is no particular lower limit to the proportion of butyl lactate permissible: the effect of the improvement in uniformity of coating simply gradually diminishes and disappears as the proportion is reduced to the vanishing point. Whereas the reason for the improvement in uniformity of coating upon the addition of lactic acid ester to the coating suspension is not perfectly understood, it is probably connected with the manner in which the ester wets the pigment, thereby producing improved dispersion of the pigment in the vehicle.

By way of example, the ingredients and detailed process for coating different colored fluorescent lamps will now be described.

Example I.—Red fluorescent lamp

This lamp utilizes a cadmium borate manganese activated phosphor over a red pigment coating on the inside surface of the glass envelope.

The red pigment is a lithopone consisting of cadmium selenosulphide and cadmium sulphide, produced by coprecipitation with added barium sulphate. The proportions of the ingredients may be as follows:

| | Percent |
|---|---|
| CdS | Approximately 24 |
| CdSeS | Approximately 17 |
| BaSO$_4$ | Approximately 58 |
| Water soluble material | Not over ½ |

A mill charge is made up consisting of 12 kilograms of the red lithopone pigment and 24 liters of binder consisting of nitrocellulose in butyl acetate. The binder is made up to the following proportions:

| | Kg. |
|---|---|
| Nitrocellulose | 1.09 |
| Butyl acetate | 141.5 |

The charge is milled for 12 hours in a 25-gallon mill. A sample for coating a lamp is then made up as follows:

20 g. of suspension from the mill
40 ml. of No. 1 binder
40 ml. of butyl acetate
6 ml. of butyl lactate The foregoing milling and mixing procedure results in the following approximate proportions by weight in the coating suspension:

| | Percent |
|---|---|
| Pigment | 7.5 |
| Nitrocellulose | 0.37 |
| Butyl acetate | 86.1 |
| Butyl lactate | 6.0 |

The lamp envelope, which may be a lime glass tube, such as is conventionally used for the envelopes of fluorescent lamps, is then coated internally with the suspension. Coating may be accomplished by upflushing, that is forcing the suspension up into the vertically supported envelope and then allowing it to drain down freely. With the elongated vitreous tubes generally used for 40-watt fluorescent lamps having a nominal length of 48 inches and a diameter of 1½ inches, the drying time in air for a sample thus coated is approximately 45 minutes. Such a drying time is undesirably long for commercial production and it may be shortened substantially by using warm air dryers to blow air internally through the envelope.

After the pigment coating is thoroughly dried, the envelope may be coated internally with the cadmium borate manganese activated phosphor by flowing it internally through the envelope as a suspension in a binder of nitrocellulose in butyl acetate and naphtha, well known to the art and commonly used for this purpose. To complete the envelope into a lamp, it is lehred, that is, subjected to a high temperature to decompose the nitrocellulose and drive out its decomposition products. In the completed lamp, the envelope is provided in the usual fashion with a pair of activated thermionic electrodes at opposite ends and with an internal filling consisting of an inert starting gas at a pressure of a few millimeters of mercury and a small quantity of mercury at least sufficient to develop during operation a pressure of a few microns. It is found that the lamp constructed as described is substantially free of streaking and has a uniform appearance when lit.

*Example 2.—Blue fluorescent lamp*

A blue fluorescent lamp utilizing a calcium tungstate lead activated phosphor and a blue pigment coating of the chrome cobalt type is made utilizing the following proportions by weight in the pigment coating suspension:

| | Percent |
|---|---|
| Pigment | 5.5 |
| Nitrocellulose | 0.35 |
| Butyl acetate | 88.8 |
| Butyl lactate | 5.4 |

*Example 3.—Green fluorescent lamp*

A green fluorescent lamp utilizing a zinc silicate manganese activated phosphor and a green pigment coating of chromium green oxide is made utilizing the following proportions by weight in the pigment coating suspension:

| | Percent |
|---|---|
| Pigment | 3.0 |
| Nitrocellulose | .39 |
| Butyl acetate | 84.6 |
| Butyl lactate | 12.0 |

In the above-described red, blue and green pigment coated lamps, the addition of a lactic acid ester is helpful in reducing or substantially eliminating streaking. The preferred coating suspension is a butyl acetate which with butyl lactate added thereto, as has been described in the foregoing examples. However, other alkyl acetates, and in particular amyl acetate, may be used for the vehicle and the improvement in coating may then be effected, in accordance with the invention, by the addition of an alkyl lactate, such as the butyl lactate or other lactic acid esters of lower alcohols. Lactic acid esters of higher alcohols than butyl would appear to be likewise utilizable except for the factor of excessively long drying time which makes them unsuitable for factory processes in manufacturing lamps.

While the above description discloses preferred and practical examples of a process of coating a vitreous tube or a lamp envelope in accordance with the invention, it will be understood that the specific details described are by way of illustration and are not to be construed as limiting the scope of the invention and that the invention is to be regarded as defined by the subjoined claims.

What we claim as new and desire to secure by Letters Patent of the United States is:

1. The method of coating a vitreous envelope with a color correcting layer of pigment having improved uniformity of thickness and freedom from streaking which comprises forming a suspension of pigment in a binder solution of nitrocellulose in butyl acetate having added thereto between 3 and 20 percent by weight of butyl lactate, applying said suspension to the surface of the envelope to form a coating thereon, and drying said coating.

2. The method of coating a vitreous envelope with a color correcting layer of red pigment having improved uniformity of thickness and freedom from streaking which comprises forming a suspension of a lithopone pigment of cadmium seleno-sulphide and cadmium sulphide, in a binder solution of nitrocellulose in butyl acetate having added thereto approximately 6 percent by weight of butyl lactate, applying said suspension to the surface of the envelope to form a coating thereon, and drying said coating.

3. The method of coating a vitreous envelope with a color correcting layer of blue pigment having improved uniformity of thickness and freedom from streaking which comprises forming a suspension of chrome cobalt pigment in a binder solution of nitrocellulose in butyl acetate having added thereto approximately 5.4 percent by weight of butyl lactate, applying said suspension to the surface of the envelope to form a coating thereon, and drying said coating.

4. The method of coacting a vitreous envelope with a color correcting layer of green pigment having improved uniformity of thickness and freedom from streaking which comprises forming a suspesion of chromium green oxide pigment in a binder solution of nitrocellulose in butyl acetate having added thereto approximately 12 percent by weight of butyl lactate, applying said suspension to the surface of the envelope to form a coating thereon, and drying said coating.

5. The method of providing a red fluorescent lamp with an internal color correcting layer of red pigment having improved uniformity of thickness and freedom from streaking which comprises forming a suspension of a lithopone pigment of cadmium seleno-sulphide and cadmium sulphide in a binder solution of nitrocellulose in butyl acetate having added thereto approximately 6 percent by weight of butyl lactate, applying said suspension to the internal surface of the vitreous envelope of the lamp to form a coating thereon, drying said coating, applying a coating of a suspension of a red producing phosphor in a nitrocellulose binder including naphtha over the pigment layer, drying said phosphor coating, and lehring said envelope to decompose the nitrocellulose and drive out the decomposition products thereof.

References Cited in the file of this patent

UNITED STATES PATENTS

| | | |
|---|---|---|
| 2,290,186 | Holman et al. | July 21, 1942 |
| 2,309,612 | Holman | Jan. 26, 1943 |
| 2,686,157 | Jones | Aug. 10, 1954 |
| 2,716,081 | Marks | Aug. 23, 1955 |
| 2,716,082 | Smith | Aug. 23, 1955 |